US008503503B1

(12) United States Patent
Tsang et al.

(10) Patent No.: US 8,503,503 B1
(45) Date of Patent: Aug. 6, 2013

(54) AGILE FREQUENCY SYNTHESIZER SCHEME FOR FAST HOPPING, LOW PHASE NOISE APPLICATIONS

(75) Inventors: Randy Tsang, Foster City, CA (US); Chun Geik Tan, Singapore (SG); Yui Lin, Cupertino, CA (US); Meng Long, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 827 days.

(21) Appl. No.: 11/771,944

(22) Filed: Jun. 29, 2007

(51) Int. Cl.
*H04B 1/00* (2006.01)

(52) U.S. Cl.
USPC ............. 375/135; 375/146; 375/295; 331/16; 331/179; 331/44

(58) Field of Classification Search
USPC .................... 375/146, 295, 135; 331/16, 179, 331/44; 327/548
See application file for complete search history.

(56) References Cited

U.S. PATENT DOCUMENTS

| 2006/0256910 A1* | 11/2006 | Tal et al. | 375/376 |
| 2007/0132517 A1* | 6/2007 | Wang et al. | 331/16 |
| 2007/0188249 A1* | 8/2007 | Abadeer et al. | 331/36 C |

\* cited by examiner

*Primary Examiner* — Leila Malek

(57) ABSTRACT

A system and method for frequency hopping precalibrates a subset of a plurality of channels, storing the channels' associated curves in a computer readable medium. Before hopping to a new channel, decision making circuitry can access the precalibrated curves. If the destination channel has an associated curve, then the system can use the values from that curve when hopping to a new channel. If the destination channel does not have an associated precalibrated curve, then the system can identify a closely situated channel with a precalibrated curve and use an offset value to settle at the destination channel. According to another aspect of the present invention, the offsets can be updated. According to a further aspect of the invention, the updated can be done dynamically.

15 Claims, 3 Drawing Sheets

System For Fast Frequency Hopping (300)

AGILE FREQUENCY SYNTHESIZER SCHEME FOR FAST HOPPING, LOW PHASE NOISE APPLICATIONS

FIELD OF THE INVENTION

Aspects of the present invention relate to the field of wireless communications. In particular, one aspect of the present invention is an improved method of frequency hopping for wireless transceivers.

BACKGROUND

As the electronics industry continues to implement wireless features into a wider array of devices, the frequency ranges at. which these devices operate continue to become more congested. For example, a typical home office may contain a number of devices, whether telephones or computer peripherals, all communicating in the 2.4 GHz frequency range. The resulting congestion can cause signal degradation, and consequently slower data transmission and/or lower quality audio communication.

Frequency hopping is well known, including adaptive frequency hopping which involves avoiding weaker channels or channels which seem to have a high number of data transmission errors. With high data rates, devices need to settle quickly on a new frequency after hopping, to avoid data transmission or communication degradation, and without introducing unnecessary noise into the system.

As a result, it would be desirable to provide a frequency hopping technique that decreases settling times without changing certain circuit parameters in a way that will result in more noise being introduced into the system.

SUMMARY OF THE INVENTION

In view of the foregoing, one aspect of the present invention reduces or even substantially eliminates settling, time after a channel hop by precalibrating a select number of channels and storing their associated curves in a computer readable medium. Before a transceiver hops to a new channel, it can access the precalibrated curves. If the destination channel has an associated curve, then the transceiver can use the values from that curve and reduce or substantially eliminate the amount of required calibration. If the destination channel does not have an associated precalibrated curve, then the transceiver can identify a closely situated channel with its own precalibrated curve and use an offset value to settle at the destination channel. According to another aspect of the present invention, the offsets can be updated. According to a further aspect of the invention, the update can be done dynamically.

DETAILED DESCRIPTION

Figure 1:
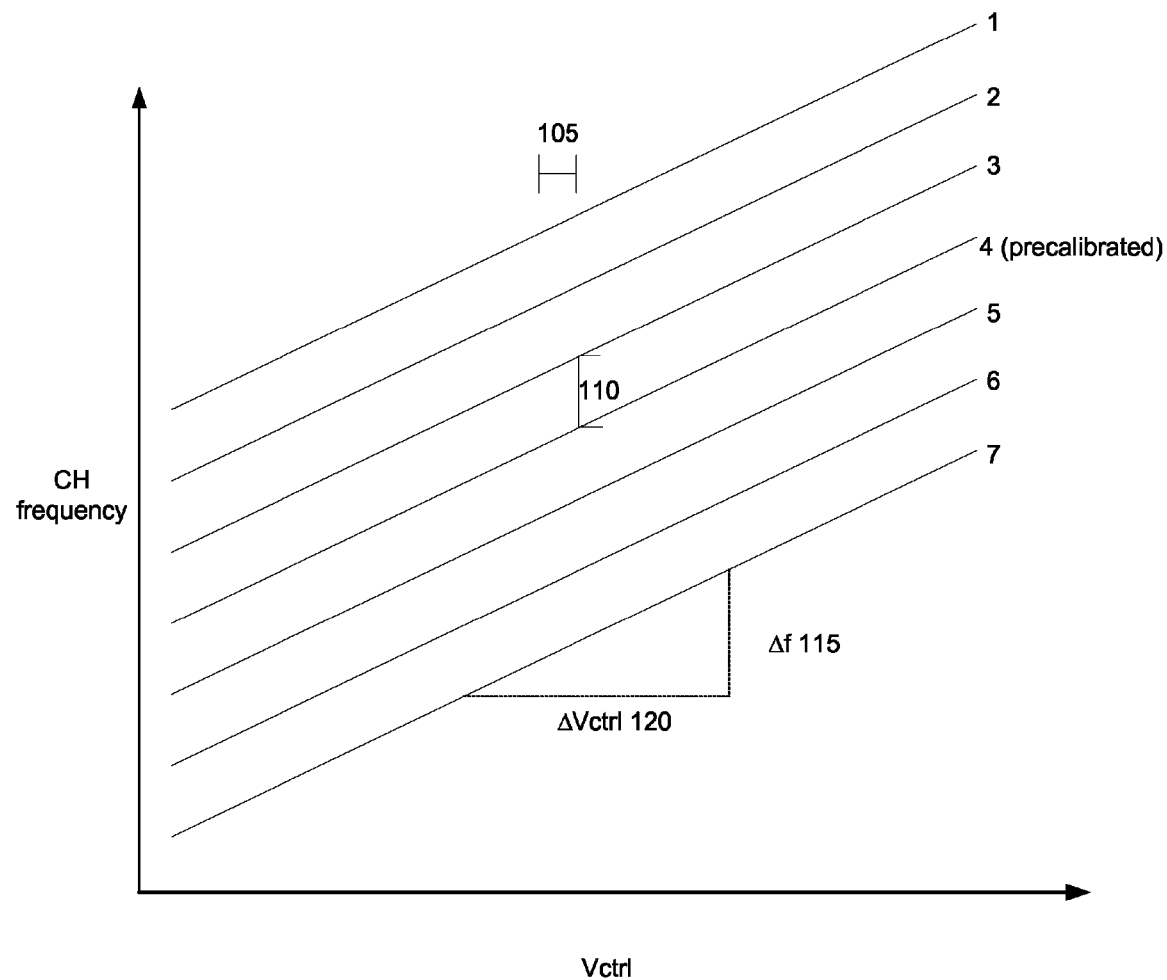
FIG. 1 is a graphical representation of voltage-frequency curves in accordance with one aspect of the present invention.

An aspect of the present invention involves precalibrating a subset of channels and using those precalibrations when frequency hopping. FIG. 1 shows a graph of a voltage-frequency representation of a number of channels (in one embodiment, there are seven such channels). A device operating on these channels may employ a phase locked loop (PLL) to produce a signal at a frequency corresponding to one of the channels. The channels may be located around the transmission frequency (in one embodiment, 2.4 GHz) and may be spaced roughly equally (in one embodiment, approximately 1 MHz apart). The frequency of the signal produced by the PLL may be a function of the control voltage (Vctrl) at the input of a VCO (which may be part of the PLL) and the setting, of a capacitance band within the VCO. A PLL may operate within a relatively narrow range of Vctrl, as illustrated by the brackets 105 in FIG. 1. The slope of the lines in FIG. 1 relates to sensitivity to changes in Vctrl. More particularly, the slope, $K_{VCO}$, is defined to be $\Delta f$ (115)/$\Delta V_{ctrl}$ (120). A lower $K_{VCO}$ can mean lower noise and more precise tuning but also can mean a longer calibration time during a frequency hop to a destination channel.

An aspect of the present invention involves precalibrating one or more channels. For example, of the seven channels shown in FIG. 1, channel 4 may be precalibrated. If the device hops to channel 4, it can do so with ver y minimal additional calibration needed because the curve associated with channel 4 has already been determined. If the device attempts to hop to another channel that has not been precalibrated, for example channel 3, it can do so by accessing the curve of channel 4 and determining the offset of channel 3 from curve 4. The offset is represented in FIG. 1 by the brackets 110. Using the same technique, the device could use precalibrated channel 4 to hop to any of the six non-precalibrated channels. This improved frequency hopping technique allows the device to hop quickly from channel to channel while keeping the $K_{VCO}$ low, thereby increasing the rate of data transmission and reducing the amount of noise in the system.

Figure 2:
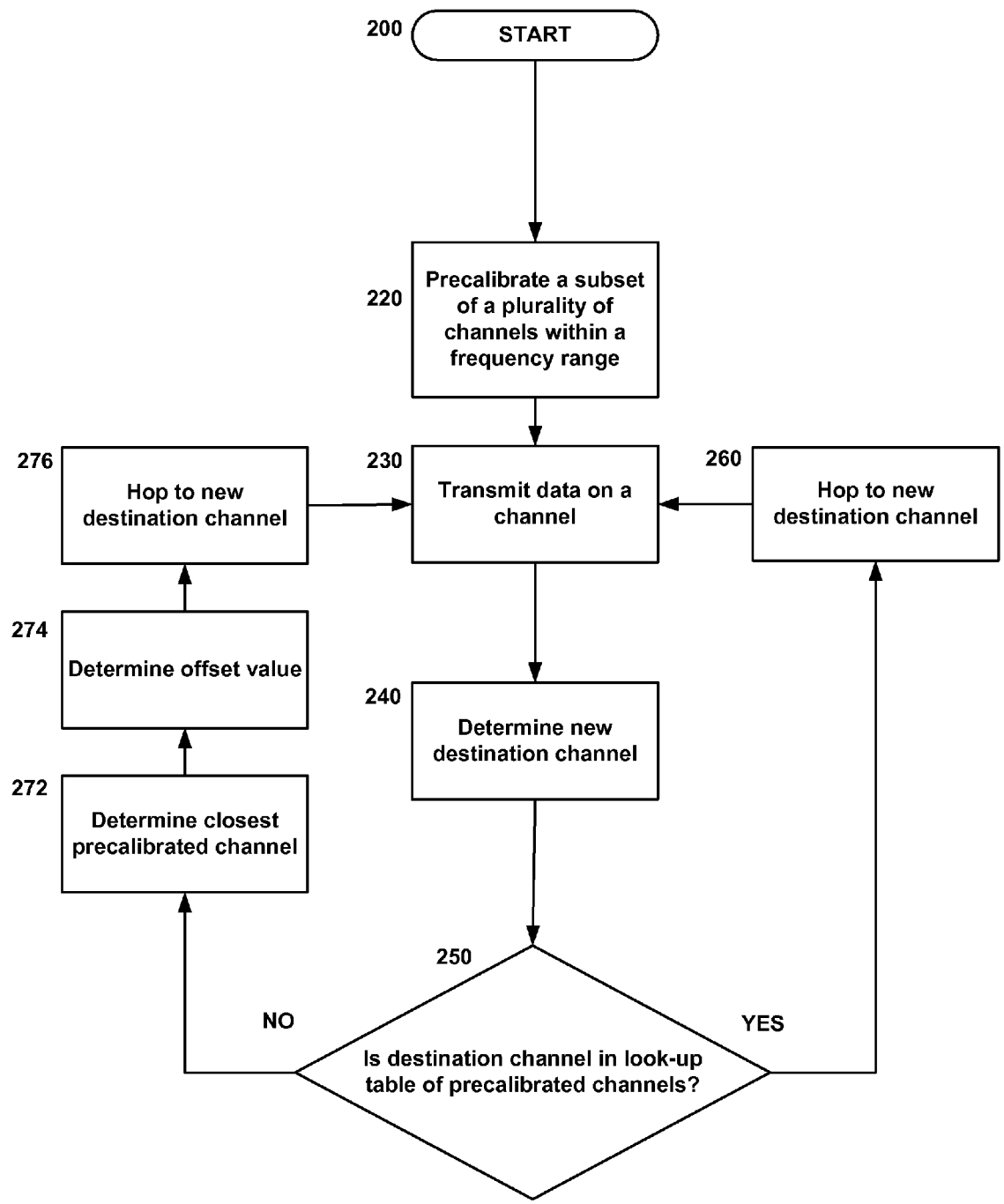
FIG. 2 is a flow diagram demonstrating an exemplary implementation of a method according to one aspect of the present invention.

FIG. 2 is a flow chart of a method of implementing the present invention. The method starts by powering on the device or enabling the transceiver (block 200). Then, a subset of a plurality of channels is precalibrated (block 220). The curves of the precalibrated channels are stored in a look-up table that may be stored in a register, ROM, or any other storage means, which may be nonvolatile. The precalibrated curves also can be written into the device's software or firmware or can be determined dynamically by either the user or the device. Although the proper operation of the method is not dependent on which channels are chosen to be precalibrated or how many are chosen, in one embodiment, approximately ten percent of the channels may be precalibrated. The selected precalibrated channels also may be spaced evenly across a frequency range. For example, for a 79 channel device, channels 5, 15, 25, 35, 45, 55, 65, and 75 may be precalibrated.

The device then is ready (block 230) to begin transmitting data. The device may transmit one or more packets of data on one of the plurality of channels. After the data has been transmitted, the device will identify a new destination channel (block 240). Identifying a new destination channel may be done in any number of ways, as will be known to ordinarily skilled artisans. Some devices may enable users to preselect preferred channels and/or exclude non-preferred channels. Other devices may select destination channels according to a random or pseudorandom algorithm. The present invention can be used either in conjunction with or independent of these various methods. In one embodiment, there may be a relationship between selection of precalibrated channels and selection of destination channels, but this approach is not required to implement the invention.

After identifying the new destination channel, the device will access the look-up table to determine the precalibrated channel nearest to the destination channel (block 250). If the destination channel is a precalibrated channel, then the device will hop to it (block 260). If the destination channel is not a precalibrated channel, then the device will determine the nearest precalibrated channel (block 272) and determine the offset from the precalibrated channel of the destination channel (block 274). The device will then use the curve of the precalibrated channel and the offset value, to determine how to hop to the non-precalibrated channel (block 276). For example, if the destination channel is channel 17 and the nearest precalibrated channel is channel 15, the device will hop to a frequency two offset values away from precalibrated channel 15.

The device may not perfectly tune to channel 17 initially, but by using information from the precalibrated channel and applying an offset, the amount of necessary calibration will be reduced. Once the device is calibrated to the new channel, it can then transmit more data (block 230). After transmitting the data, the device will then determine another channel to hop to (block 240) and begin the process of hopping again.

It should be noted that, while the foregoing description has been provided with reference to data transmission, "data" can include voice communication, which may take analog or digital form.

Figure 3:
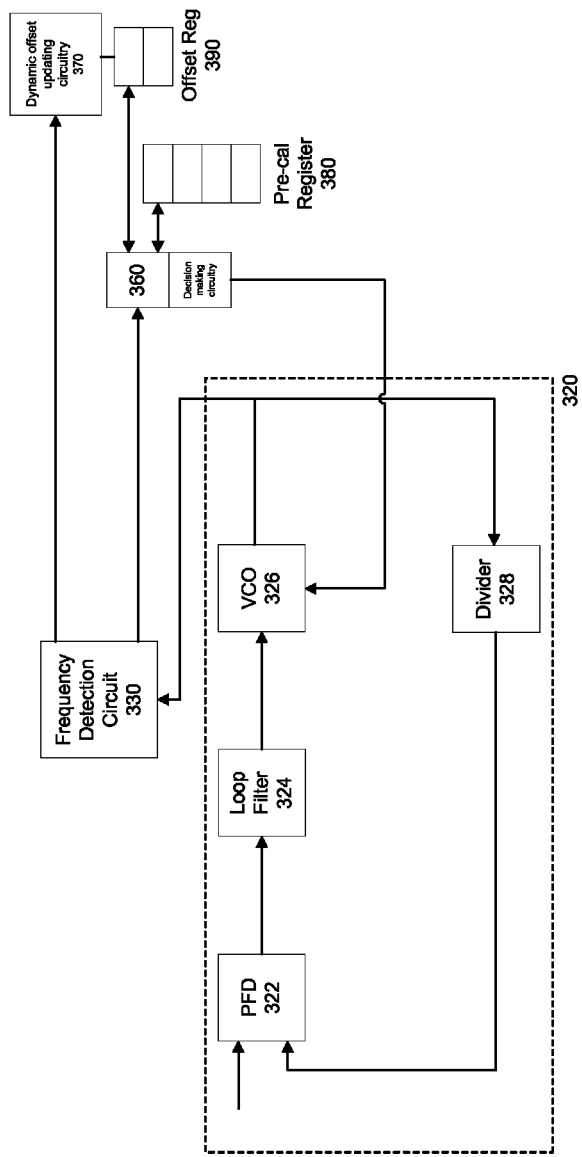
FIG. 3 is a diagram of circuitry in accordance with one aspect of the present invention.

FIG. 3 illustrates a circuit schematic for an embodiment of the present invention. The system 300 shown may be implemented in a wireless transceiver. A phase-locked loop (PLL) 320 includes a phase frequency detector (PFD) 322, a loop filter 324, a voltage-controlled oscillator (VCO) 326, and a divider 328. The VCO 326 may include a capacitance band to permit varying of the capacitance to achieve the desired output frequency.

The system 300 further contains frequency detection circuitry 330 for detecting the frequency of the PLL 320. Based on the frequency detected, decision making circuitry 360 can adjust the capacitance of the VCO 326 so that the output frequency will be closer to the desired frequency. Once the capacitance of the VCO 326 has been adjusted, the frequency detection circuitry 330 can once again detect the frequency of the PLL 320, and the decision making circuitry 360 can once again adjust the capacitance of the VCO 326, getting closer yet to the desired frequency. This iterative process occurs until the transceiver is calibrated to the desired frequency.

Every time the decision making circuitry 360 changes the capacitance of the VCO 326, there is a propagation and/or settling delay before the frequency detection circuitry 330 can detect the new frequency of the PILL 320. Each additional iteration increases the amount of time needed for the system 300 to settle at the destination frequency.

In order for the system 300 to reduce the number of iterations needed to calibrate, and as a result, the time needed for the system 300 to settle at a new destination channel, an aspect of the present invention calls for using precalibrated channels to predefine the initial change of capacitance to the VCO 326, thus resulting in fewer iterations needed to calibrate and a quicker transition from one channel to another. The decision making circuitry 360 accesses a look-up table 380 that stores the curves associated with precalibrated channels. The look-up table 380 can be stored in a register or any other form of storage medium. If the destination channel is one of the precalibrated channels, then the decision making circuitry 360 can adjust the capacitance of the VCO 326 accordingly. If the destination channel is not a precalibrated channel, then the decision making circuitry 360 can find the closest precalibrated channel per the look-up table 380, and base its initial capacitance change on the closest precalibrated channel and an offset value. The offset value used to hop to channels that are not precalibrated can be predetermined by calculations and experimentation and stored in a register 390 or any other form of storage medium accessible by the decision making circuitry 360.

After the decision making circuitry 360 adjusts the capacitance based on the precalibrated channel, the frequency detection circuitry 330 will detect the frequency of the PLL 320, and the decision making circuitry 360 can further calibrate if needed. The frequency hopping technique of the present invention improves the initial adjustment to the capacitance of the VCO 326, reducing or eliminating the need for additional calibration. The decision making circuitry 360 can determine when to adjust the capacitance based on a precalibrated channel and when to adjust it based on the iterative calibration technique discussed above.

An additional aspect of the present invention includes dynamically updating the offset values to account for variances in operating temperatures and components, among other things, as will be known to ordinarily skilled artisans. The offset register 390 can be updated by dynamic updating circuitry 370 which calculates updates to the offset values based on the frequencies detected by the frequency detection circuitry 330. For example, if after adjusting the capacitance based on a precalibrated curve, the frequency detected by the frequency detection circuitry 330 is consistently higher than the frequency of the desired channel by a certain value, then the dynamic updating circuitry 370 can adjust the offset value accordingly.

The previous description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment. Therefore, the present invention is not intended to be limited to the embodiments described herein but is to be accorded the widest scope defined only by the claims below and equivalents thereof.

What is claimed is:

1. A method comprising:
   selecting, as an output frequency of a voltage controlled oscillator, a destination frequency from a plurality of frequencies, each of the frequencies spaced equally by a frequency gap from other adjacent frequencies, the plurality of frequencies are within a transmission frequency range of a transmitter associated with the voltage controlled oscillator;
   determining, via a decision making circuit, whether a look-up table containing precalibration information for one or more of the plurality of frequencies includes precalibration information for the selected destination frequency;
   determining, from the selected destination frequency, an offset to a single one of the plurality of frequencies for which the look-up table includes precalibration information responsive to the look-up table not including the precalibration information for the selected destination frequency;
   accessing, based on the offset, a storage element for offset information useful to alter the output frequency of the voltage controlled oscillator; and
   using the offset information and the precalibration information for the single one of the plurality of frequencies to settle the output frequency of the voltage controlled oscillator at the selected destination frequency.

2. The method of claim 1, further comprising determining which of the plurality of frequencies for which the look-up table includes precalibration information is closest to the selected destination frequency, and wherein the single one of the plurality of frequencies is the closest one of the plurality frequencies to the selected destination frequency.

3. The method of claim 1, further comprising, prior to determining whether the look-up table includes the precalibration information for the selected destination frequency, defining the precalibration information for one or more of the plurality of frequencies.

4. The method of claim 1, further comprising defining the offset information for the single one of the plurality of frequencies based on one or more operating conditions of the voltage controlled oscillator.

5. A circuit comprising:
 a transmitter configured to transmit, based on an output of a voltage controlled oscillator, a signal at a destination frequency selected from a plurality of frequencies spaced equally within a transmission frequency range of the transmitter;
 a look-up table containing precalibration information for one or more of the plurality of frequencies; and
 a decision making circuit configured to:
  determine whether the look-up table includes precalibration information for the destination frequency;
  determine an offset from the destination frequency to a single one of the plurality of frequencies for which the look-up table includes precalibration information responsive to the look-up table not including precalibration information for the destination frequency;
  access, based on the offset, a storage element for offset information useful to alter the output of the voltage controlled oscillator; and
  use the offset information and the precalibration information for the single one of the plurality of frequencies to settle the output frequency of the voltage controlled oscillator at the destination frequency.

6. The circuit of claim 5, further comprising dynamic offset updating circuit configured to dynamically update the offset information based on one or more operational conditions of the circuit.

7. The circuit of claim 5, wherein the decision making circuit is configured to alter or settle the output of the voltage controlled oscillator by changing a capacitance of circuit associated with the voltage-controlled oscillator.

8. The circuit of claim 5, further comprising frequency detection circuit configured to detect a frequency of the output of the voltage controlled oscillator.

9. The circuit of claim 8, wherein the decision making circuit is further configured to alter the output of the voltage controlled oscillator based on the frequency detected by the frequency detection circuit.

10. The circuit of claim 6, wherein the one or more operational conditions of the circuit include a temperature of the circuit.

11. A circuit comprising:
 transmitting means for transmitting, based on an output of a voltage controlled oscillator, a signal at a destination frequency selected from a plurality of frequencies spaced equally within a transmission frequency range of the transmitting means;
 storing means for storing precalibration information for one or more of the plurality of frequencies; and
 decision making means for:
  determining whether the precalibration storing means includes precalibration information for the destination frequency;
  determining, from the destination frequency, an offset to a single one of the plurality of frequencies for which the precalibration storing means includes precalibration information responsive to the precalibration storing means not including precalibration information for the destination frequency;
  accessing, based on the offset, a storage element for offset information useful to alter the output of the voltage controlled oscillator; and
  using the offset information and the precalibration information for the single one of the plurality of frequencies to settle the output of the voltage controlled oscillator at the destination frequency.

12. The circuit of claim 11, further comprising updating means for updating the offset information based on or more operational conditions of the circuit.

13. The circuit of claim 11, wherein the decision making means is configured to alter or settle the output of the voltage controlled oscillator by changing a capacitance of circuitry associated with the voltage controlled oscillator.

14. The circuit of claim 11, further comprising:
 detection means for detecting a frequency of the output of the voltage controlled oscillator.

15. The circuit of claim 14, wherein said decision making means alters the output of the voltage controlled oscillator based on the frequency detected by the detection means.

* * * * *